US012199374B2

(12) United States Patent
Hamai et al.

(10) Patent No.: US 12,199,374 B2
(45) Date of Patent: Jan. 14, 2025

(54) CONNECTOR AND MOUNTING STRUCTURE

(71) Applicant: YAZAKI CORPORATION, Tokyo (JP)

(72) Inventors: Tsuyoshi Hamai, Makinohara (JP); Takatoshi Suzuki, Makinohara (JP); Junya Yamamoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 267 days.

(21) Appl. No.: 17/965,777

(22) Filed: Oct. 14, 2022

(65) Prior Publication Data

US 2023/0120275 A1 Apr. 20, 2023

(30) Foreign Application Priority Data

Oct. 19, 2021 (JP) ................................ 2021-171072

(51) Int. Cl.
*H01R 9/24* (2006.01)
*H01R 13/422* (2006.01)
*H01R 13/52* (2006.01)

(52) U.S. Cl.
CPC ......... *H01R 13/5205* (2013.01); *H01R 9/245* (2013.01); *H01R 13/422* (2013.01)

(58) Field of Classification Search
CPC ...................................................... H01R 9/245
See application file for complete search history.

(56) References Cited

U.S. PATENT DOCUMENTS

2007/0139842 A1* 6/2007 De' Longhi ........... H01R 24/28 361/103
2008/0268671 A1* 10/2008 Harris .................. H01R 12/523 439/76.2
2009/0066470 A1* 3/2009 Miyamoto ............. H01H 85/22 337/163
2014/0305693 A1* 10/2014 Greenberg ............... H02G 3/08 174/559
2016/0233625 A1 8/2016 Kato et al.
2023/0268685 A1* 8/2023 Yamada ............. H01R 13/6592 439/345

FOREIGN PATENT DOCUMENTS

JP 2015-79723 A 4/2015
JP 2016-18692 A 2/2016

* cited by examiner

*Primary Examiner* — Hung V Ngo
(74) *Attorney, Agent, or Firm* — KENEALY VAIDYA LLP

(57) ABSTRACT

There are provided a connector and a mounting structure, the connector including: a terminal fitting; an electric wire connected to the terminal fitting; a housing that includes a fitting portion having a shape protruding in a fitting direction with a mating part and accommodating the terminal fitting, an outer wall portion defining an internal space in which the electric wire is routed, and a hollow convex portion formed by a part of the outer wall portion protruding outward to have a convex shape in the fitting direction; and a fuse that includes a fused portion accommodated in a hollow portion of the convex portion and is connected to the electric wire.

3 Claims, 5 Drawing Sheets

CONNECTOR AND MOUNTING STRUCTURE

CROSS-REFERENCE TO RELATED APPLICATIONS

This application is based on and claims priority under 35 USC 119 from Japanese Patent Application No. 2021-171072 filed on Oct. 19, 2021, the contents of which are incorporated herein by reference.

TECHNICAL FIELD

The present disclosure relates to a connector with a fuse built in a housing, and a mounting structure of the connector and a mating part.

BACKGROUND ART

In related art, a mounting structure for mounting a connector with a built-in fuse to a mating part (for example, various electrical components such as an inverter) is proposed (see JP2016-018692A and JP2015-079723A, for example).

When the connector with a built-in fuse is energized, a temperature of a conductive path (particularly, a fused portion of the fuse) in the connector increases due to Joule heat generated by the energization. However, in the connector described above in the related art, since the fuse is accommodated inside the housing, it is generally difficult to dissipate heat from the fuse. Therefore, there is concern that heat generated by the fuse may have a thermal effect on the housing and built-in components around the fuse.

SUMMARY OF INVENTION

The present disclosure provides a connector with a built-in fuse that is excellent in dissipating heat generated by the fuse when energized, and a mounting structure of the connector and a mating part.

According to an illustrative aspect of the present disclosure, a connector includes: a terminal fitting; an electric wire connected to the terminal fitting; a housing that includes a fitting portion having a shape protruding in a fitting direction with a mating part and accommodating the terminal fitting, an outer wall portion defining an internal space in which the electric wire is routed, and a hollow convex portion formed by a part of the outer wall portion protruding outward to have a convex shape in the fitting direction; and a fuse that includes a fused portion accommodated in a hollow portion of the convex portion and is connected to the electric wire.

According to another illustrative aspect of the present disclosure, a mounting structure includes: the connector according to the above-mentioned aspect; and the mating part to which the connector is mounted. The mating part includes a fitted portion into which the fitting portion of the connector is fitted, and a concave portion recessed in a direction away from the connector such that the convex portion of the connector is fitted into the concave portion. The connector is mounted to the mating part in a state where the fitting portion is fitted with the fitted portion and the convex portion is fitted in the concave portion.

The present disclosure is briefly described above. Details of the present disclosure will be further clarified by reading through a mode for carrying out the present disclosure described below (hereinafter, referred to as "embodiment") with reference to the accompanying drawings.

DESCRIPTION OF EMBODIMENTS

Embodiment

Figure 1:
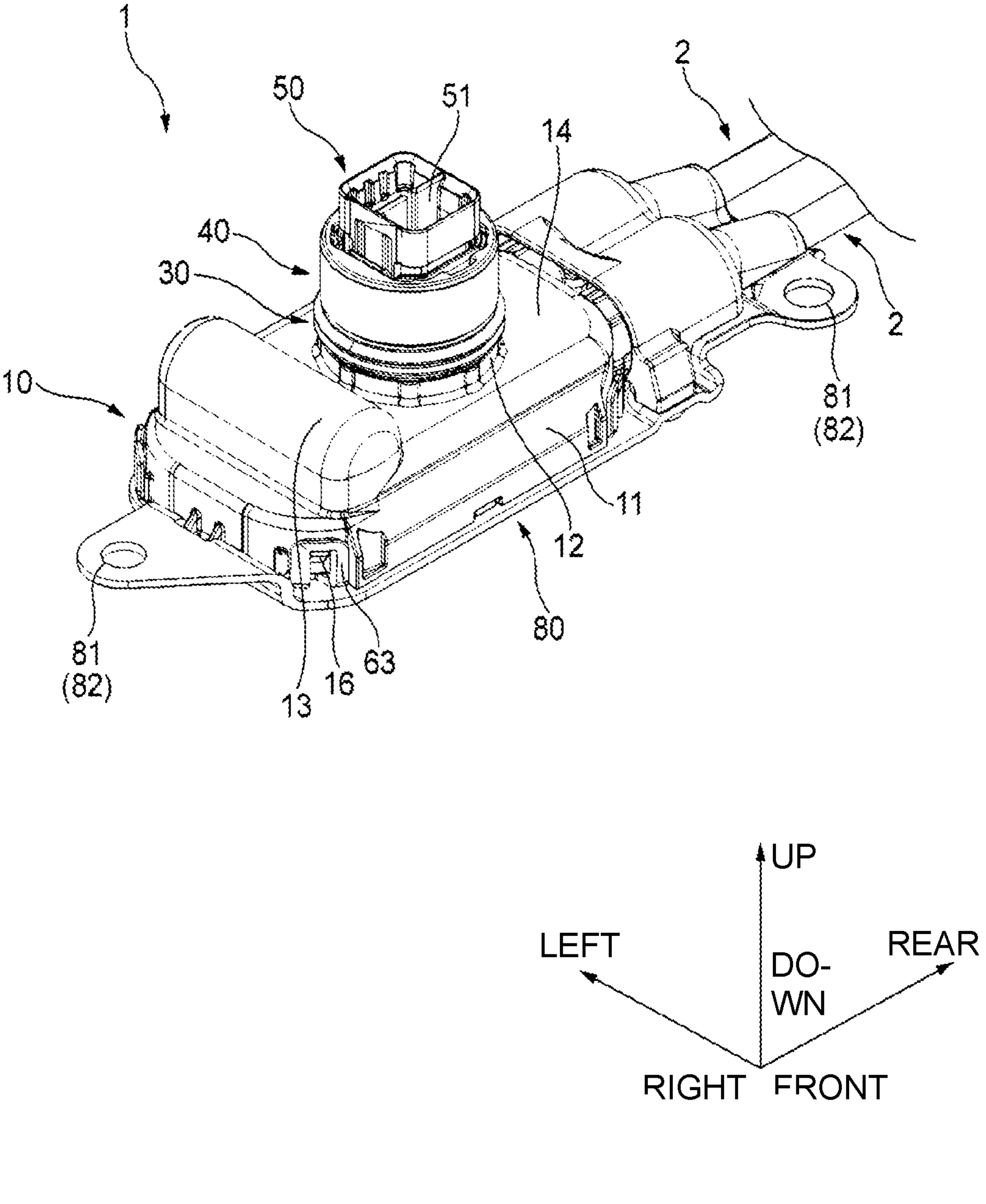
FIG. 1 is a perspective view showing a connector according to an embodiment of the present disclosure.

Hereinafter, a connector 1 according to an embodiment of the present disclosure will be described with reference to the drawings. The connector 1 shown in FIG. 1 functions as a relay connector that electrically connects a pair of electric wires 2 extending from a body portion 11 of a housing 10 and a mating part 90 (see FIGS. 3 and 4) including a fitted portion 91 to be fitted to a fitting portion 12 of the housing 10. The mating part 90 is, for example, an inverter (DC-AC converter) mounted on a vehicle, and one end portions of the pair of electric wires 2 extending from the body portion 11 are connected to, for example, an air conditioner mounted on the vehicle.

Hereinafter, for convenience of explanation, a "front-rear direction", an "up-down direction" and a "left-right direction" are defined as shown in FIGS. 1 to 5. The "front-rear direction", the "up-down direction" and the "left-right direction" are orthogonal to each other. The up-down direction coincides with a fitting direction of the fitting portion 12 and the fitted portion of the mating part.

The connector 1 includes the housing 10. The housing 10 is a resin molded product, and as shown in FIGS. 1, 3 and 4, mainly includes the body portion 11, the fitting portion 12, and a convex portion 13 integrally.

Figure 2:
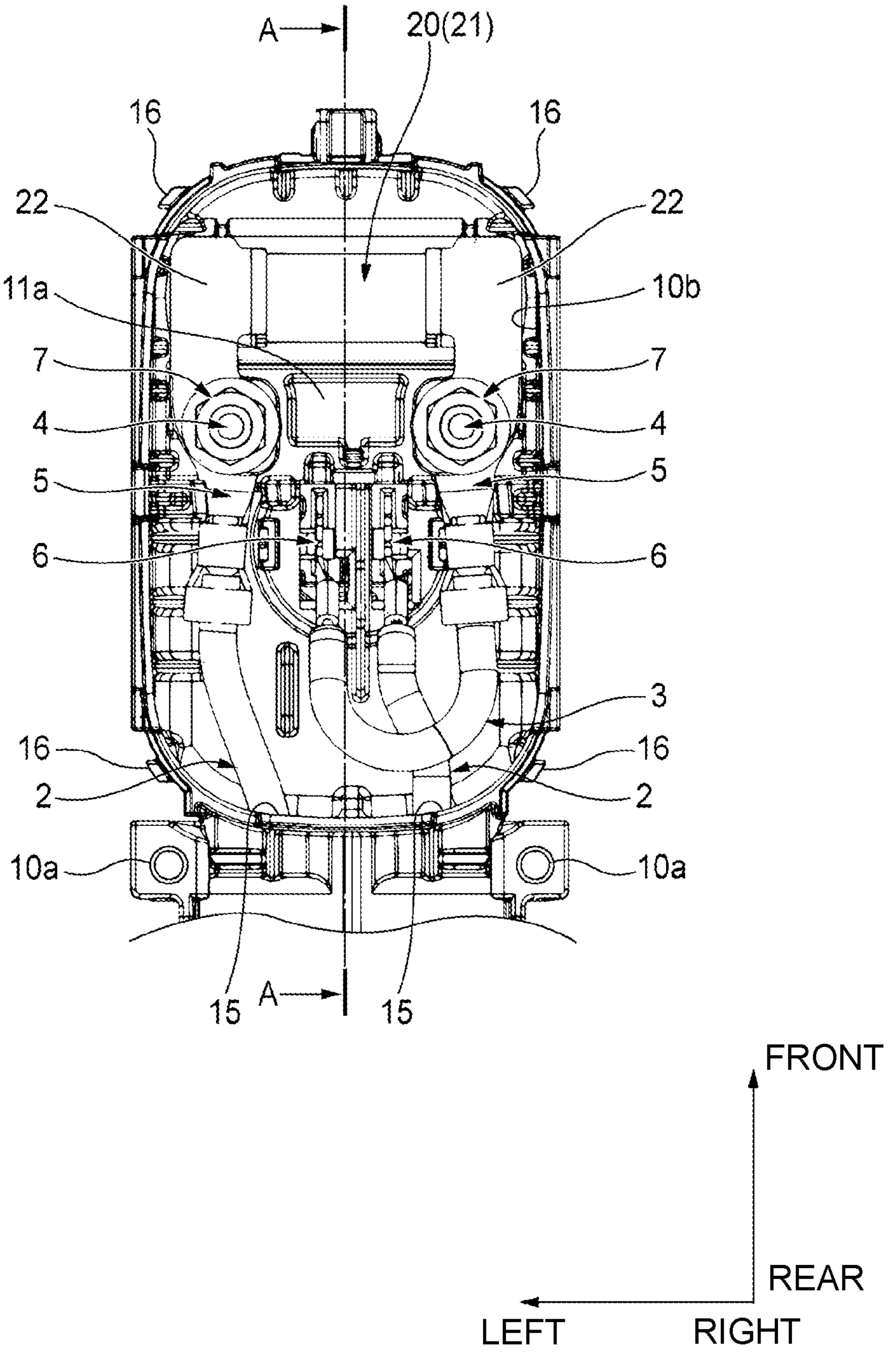
FIG. 2 is a bottom view showing an internal structure of a body portion of a housing.

As shown in FIGS. 1, 2 and the like, the body portion 11 has a substantially rectangular parallelepiped box shape extending in the front-rear direction. A substantially rectangular opening 10*b* is formed in a lower portion of the body portion 11 so as to communicate an internal space 11*a* (see FIG. 2) of the body portion 11 with outside in the up-down direction (see FIG. 2). The opening 10*b* is liquid-tightly closed by a resin cover 60 attached with a rubber packing 70 (see FIG. 3). Details of the cover 60 and the packing 70 will be described later. Various parts including a fuse 20, which will be described later, are accommodated in the internal space 11*a* of the body portion 11 (see FIG. 2).

Figure 3:
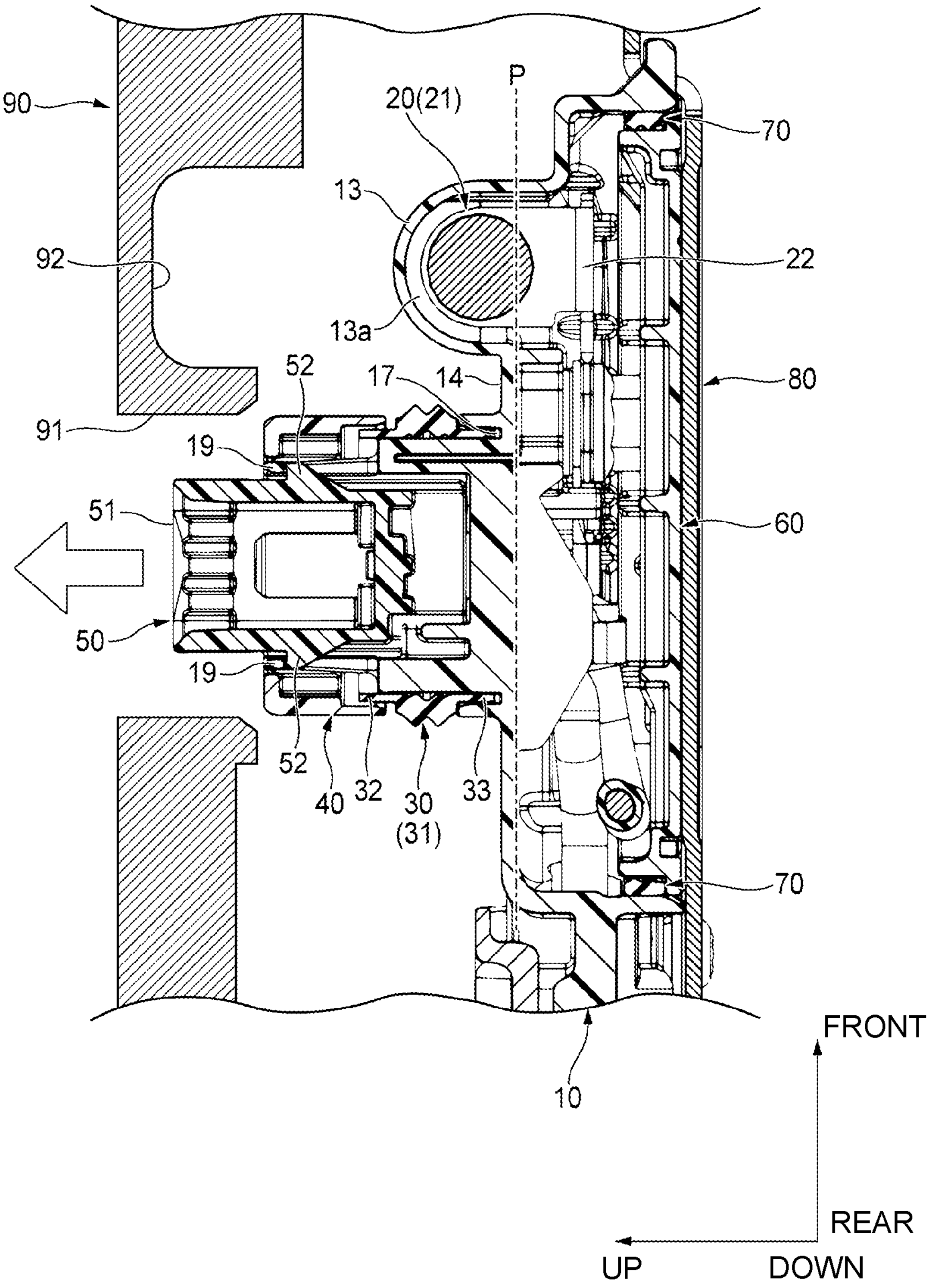
FIG. 3 is a cross-sectional view corresponding to a cross section taken along a line A-A in FIG. 2 for explaining a state of the connector shown in FIG. 1 being mounted to a mating part.
Figure 4:
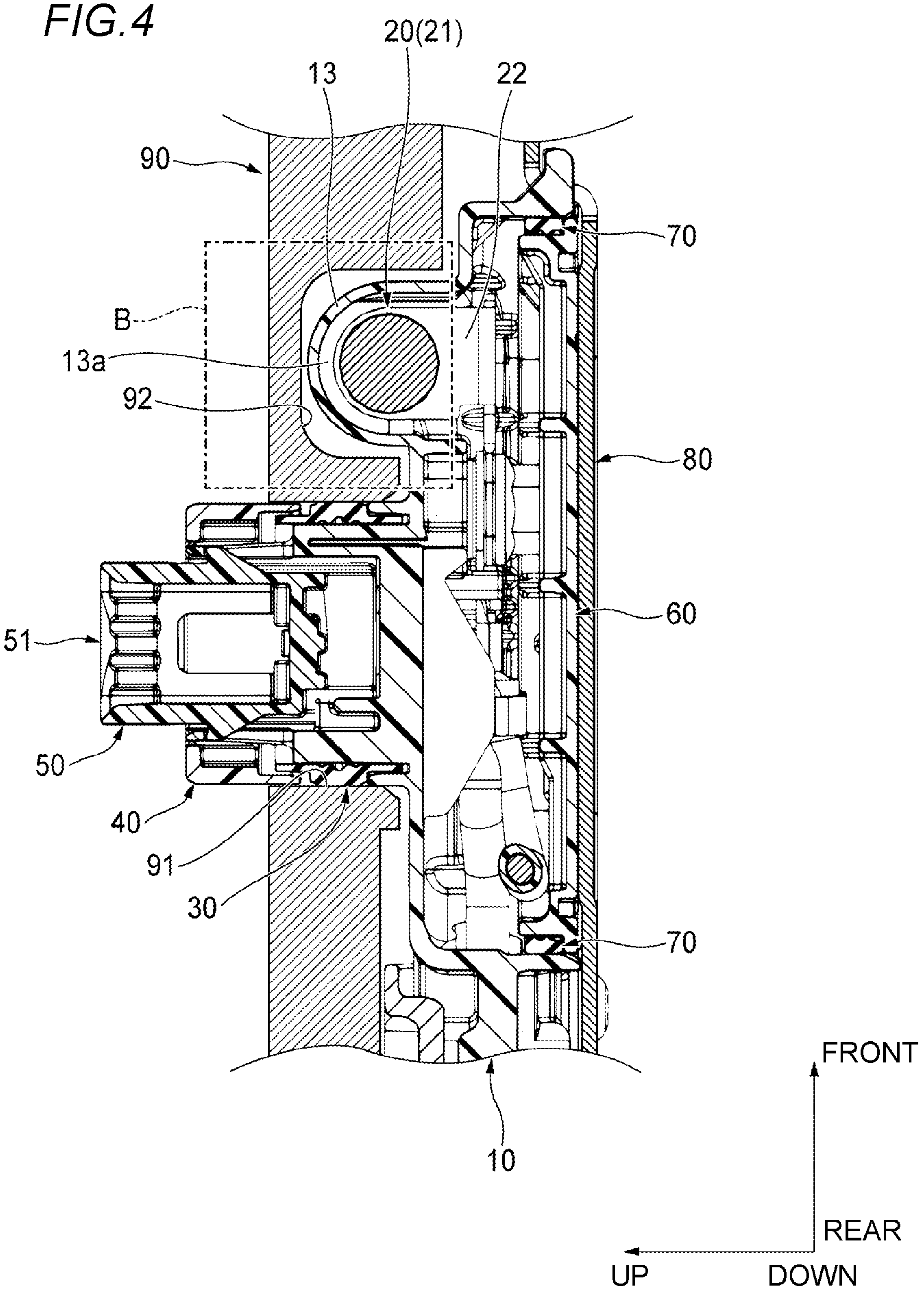
FIG. 4 is a diagram corresponding to FIG. 3 in a state in which mounting of the connector to the mating part is completed.
Figure 5:
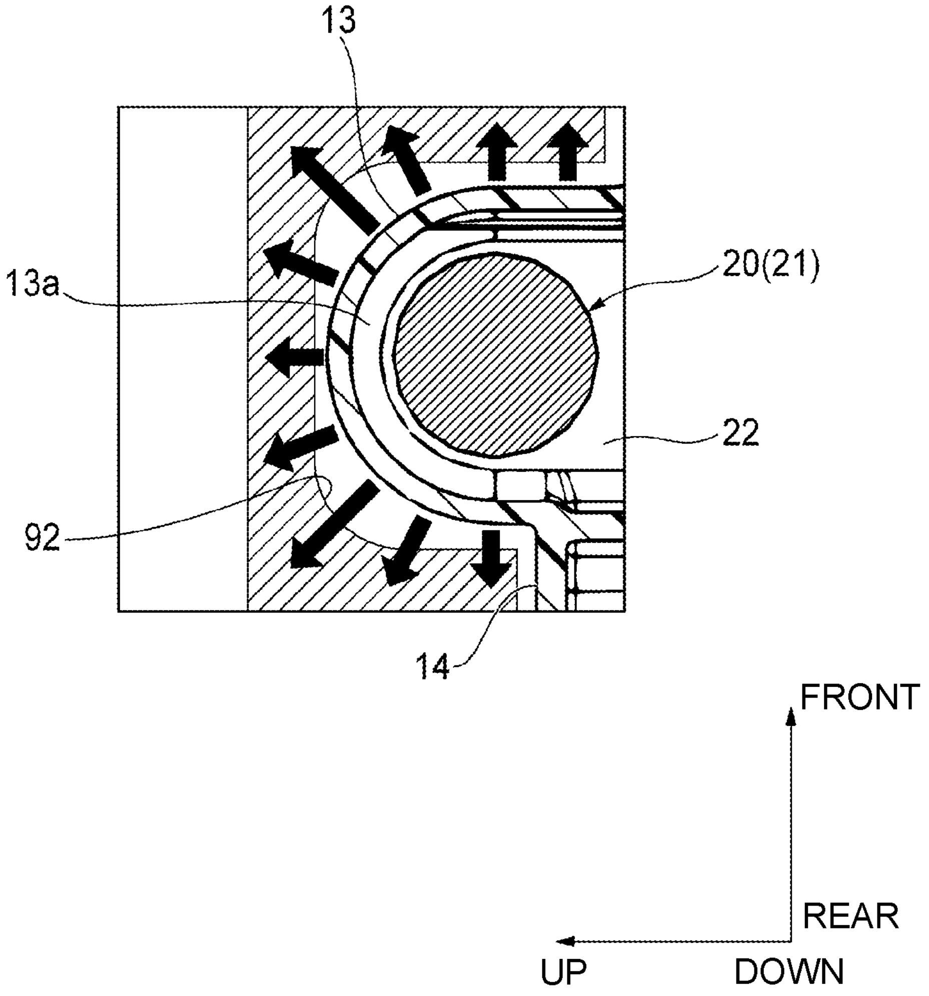
FIG. 5 is an enlarged view of a part B in FIG. 4 for explaining a state in which heat generated by a fuse is dissipated from a convex portion of the housing to surroundings and is absorbed by a concave portion of the mating part.

As shown in FIG. 1, the fitting portion 12 is a substantially cylindrical portion that protrudes upward from a substantially central portion of an upper surface of the body portion 11, and is a portion that constitutes a fitting location with the fitted portion 91 of the mating part 90 (also see FIGS. 3 and 5). As shown in FIG. 3, a packing 30, a front holder 40, and an inner housing 50 are attached to the fitting portion 12 in this order from above (see FIGS. 1 and 3). Details of the packing 30, the front holder 40, and the inner housing 50 will be described later.

As shown in FIGS. 1 and 2, the convex portion 13 is a portion including an upper surface protruding upward and a lower surface recessed upward at a front end portion of an upper wall 14 (outer wall) of the body portion 11. In this example, the convex portion 13 has a semi-cylindrical shape that protrudes upward and extends in the left-right direction. In other words, in the convex portion 13, a part of the upper wall 14 (outer wall) of the body portion 11 is curved so as to protrude upward, thereby forming a hollow portion 13*a* below the curved part. More specifically, the hollow portion 13*a* defined by the convex portion 13 refers to a space above a plane to which a surface below the upper wall 14 of the body portion 11 belongs (a virtual plane P indicated by a one-dot chain line in FIG. 3), and surrounded by the curved upper wall 14 (that is, the convex portion 13). Note that a thickness of the upper wall 14 (outer wall) of the body portion 11 at such a curved place is substantially constant. The convex portion 13 is a portion that functions to accommodate (a body portion 21 of) the fuse 20 (see FIG. 2)

As shown in FIGS. 2 to 4, the fuse 20 includes the cylindrical body portion 21 (so-called glass tube) with a built-in fused portion and a pair of metal extension plates 22 extending from both end portions of the body portion 21. When a current exceeding a predetermined rated current flows through the body portion 21 via the pair of extension plates 22, the fuse 20 functions to break electrical connection between the pair of extension plates 22 by fusing the fused portion described above.

As shown in FIGS. 2 to 4, the body portion 21 of the fuse 20 is accommodated in the hollow portion 13*a* of the convex portion 13 (that is, the above-described space defined by the virtual plane P and the convex portion 13). More specifically, in this example, the body portion 21 of the fuse 20 is disposed so that almost the entire body portion 21 exists above the above-described virtual plane P (that is, inside the hollow portion 13*a*). As a result, as shown in FIGS. 3 and 4, an entire area of a semi-cylindrical outer peripheral surface of an upper approximately half of the body portion 21 of the fuse 20 is disposed close to a semi-cylindrical inner surface of the convex portion 13. Functions and effects of accommodating the body portion 21 of the fuse 20 in the convex portion 13 will be described later. Note that although the optimum disposition of the body portion 21 in the hollow portion 13*a* depends on a size relation between the hollow portion 13*a* and the body portion 21, respective shapes thereof, and the like, in terms of the functions and effects described later, it is sufficient that at least a part of the body portion 21 exists above the above-described virtual plane P (that is, inside the hollow portion 13*a*). In other words, the above-described "accommodating" means that at least a part of the body portion 21 exists above the above-described virtual plane P (that is, inside the hollow portion 13*a*).

The pair of extension plates 22 of the fuse 20 are connected to a pair of stud bolts 4 integrated with the body portion 11 of the housing 10 by insert molding, respectively. The pair of stud bolts 4 extends downward within the internal space 11*a* so as to be spaced apart in the left-right direction, from a position between the fitting portion 12 and the convex portion 13 in the front-rear direction on the upper wall 14 of the body portion 11.

A pair of terminal insertion holes (not shown) are formed at a position corresponding to the fitting portion 12 on the upper wall 14 of the body portion 11 of the housing 10 so as to be spaced apart in the left-right direction and communicate the internal space 11*a* and an interior of the fitting portion 12 in the up-down direction. A pair of terminals 6 (see FIG. 2) are inserted from below into the pair of terminal insertion holes. As a result, the terminals 6 are accommodated in the fitting portion 12.

As shown in FIG. 2, a pair of electric wire insertion holes 15 are formed on a rear wall of the body portion 11 of the housing 10 so as to be spaced apart in the left-right direction and communicate the internal space 11*a* of the body portion 11 with the outside in the front-rear direction. In this way, the pair of electric wire insertion holes 15 is positioned so as to sandwich the fitting portion 12 in the front-rear direction with the convex portion 13.

The other end portions of the pair of electric wires 2 extending from the housing 10 are inserted through the pair of electric wire insertion holes 15, respectively, and the other end portions of the pair of electric wires 2 are routed in the internal space 11*a*. Furthermore, an electric wire 3 is routed inside the internal space 11*a*. Terminals (so-called LA terminals) 5 are connected to the other end portion of the wire 2 inserted through the electric wire insertion hole 15 on the left side and one end of the wire 3, respectively. The terminals 6 having a rectangular flat plate-like shape are connected to the other end portion of the wire 2 inserted through the electric wire insertion hole 15 on the right side and the other end of the wire 3, respectively.

The pair of terminals 5 are connected to the pair of stud bolts 4, respectively, and are tightened together with the pair of extension plates 22 of the fuse 20 using a pair of nuts 7 (see FIG. 2). The pair of terminals 6 are inserted into the pair of terminal insertion holes of the housing 10 from below and fixed to the housing 10 with upper end portions thereof exposed inside the fitting portion 12. The pair of terminals 6 are fixed to the housing 10 by a pair of locking pieces (not shown) provided on the inner housing 50 attached to the fitting portion 12 engaging with a pair of locking holes (not shown) provided on the pair of terminals 6. As a result, of the pair of electric wires 2 extending from the housing 10, the electric wire 2 on the right side is directly connected to the terminal 6 on the right side, and the electric wire 2 on the left side is connected to the terminal 6 on the left side via the fuse 20.

As shown in FIG. 2, a locking projection 16 is provided at each one of four corner portions on an outer peripheral side surface of the body portion 11 of the housing 10. The locking projections 16 function to hold the cover 60 to the housing 10 in cooperation with locking frame portions 63 (see FIG. 1) of the cover 60, which will be described later.

Next, details of the fitting portion 12 of the housing 10, and details of the packing 30, the front holder 40, and the inner housing 50 attached to the fitting portion 12 from above will be described in order with reference to FIGS. 1 and 3.

First, the fitting portion 12 will be described. An annular groove portion 17 that is open upward and recessed downward is formed around a base portion of the substantially cylindrical fitting portion 12 that protrudes from the upper wall 14 of the body portion 11 of the housing 10 (see FIGS. 3 to 5). A lower edge portion 33, which will be described later, of the packing 30 is accommodated in the annular groove portion 17 (see FIGS. 3 and 4).

As shown in FIG. 3, a pair of locking frame portions 19 is formed on both end portions of an upper region of the substantially cylindrical fitting portion 12 in the front-rear direction, respectively, so as to face each other in the front-rear direction and extend in the left-right direction. Each locking frame portion 19 has a cantilever shape with an upper end as a free end, and is elastically deformable in the front-rear direction. The pair of locking frame portions 19 function to lock the inner housing 50 (see FIG. 3).

Next, the packing 30 will be described. The packing 30 is a rubber seal member having a substantially cylindrical shape. The packing 30 functions to seal a gap between an outer periphery of the fitting portion 12 and an inner periphery of the fitted portion 91 of the mating part 90 to be fitted with the fitting portion 12.

The packing 30 includes a cylindrical body portion 31 formed with annular lip portions on the inner periphery and outer periphery sides, a cylindrical upper edge portion 32 extending upward from the body portion 31, and a cylindrical lower edge portion 33 extending downward from the body portion 31. The packing 30 is externally inserted into the fitting portion 12 from above and thus attached to fitting portion 12 so that the lower edge portion 33 is accommodated in the annular groove portion 17 and closely adheres to the outer periphery (a cylindrical lower region) of the fitting portion 12.

Next, the front holder 40 will be described. The front holder 40 is a resin molded product, and is disposed adjacent to the packing 30 to prevent the packing 30 from coming off (upwardly) from the fitting portion 12. As shown in FIG. 3 and the like, the front holder 40 has a hollow annular (substantially cylindrical) shape as a whole.

The front holder 40 is inserted from above into the fitting portion 12 to which the packing 30 is attached, and is attached to the outer periphery of the fitting portion 12 so that a lower edge portion thereof covers an outer periphery of the upper edge portion 32 of the packing 30 (see FIG. 3). When the front holder 40 is attached to the fitting portion 12, by engaging a pair of engaging projections (not shown) of the front holder 40 with a pair of through holes (not shown) of the fitting portion 12 of the housing 10, the front holder 40 is prevented from coming off (upwardly) from the fitting portion 12. The lower edge portion of the front holder 40 is adjacent to the packing 30 and covers the outer periphery of the upper edge portion 32 of the packing 30, thereby preventing the packing 30 from coming off (upwardly) from the fitting portion 12.

Next, the inner housing 50 will be described. The inner housing 50 is a resin molded product, and has a function of defining an opening into which a mating connector (not shown) of the mating part 90 is inserted, a function of holding the terminals 6, a function of aligning the terminals 6 with mating terminals (not shown) provided on the mating part (not shown) (so-called alignment function), and the like. As shown in FIGS. 1 and 3, the inner housing 50 has a substantially rectangular cylindrical shape extending in the up-down direction. An upper end opening 51 of the inner housing 50 functions as an opening into which the mating connector of the mating part 90 is inserted.

A pair of locking projections 52 are formed on a pair of side surfaces of the inner housing 50 facing each other in the front-rear direction, respectively, as shown in FIG. 3. The inner housing 50 is inserted from above into the fitting portion 12 to which the packing 30 and the front holder 40 are attached, and disposed in a cylinder of the fitting portion 12. When the inner housing 50 is attached to the fitting portion 12, as shown in FIG. 3, by engaging the pair of locking projections 52 of the inner housing 50 with the opening edges of the pair of locking frame portions 19 of the fitting portion 12 of the housing 10, the inner housing 50 is prevented from coming off (upwardly) from the fitting portion 12.

In this way, the pair of terminals 6 are inserted into the pair of terminal insertion holes (not shown) of the housing 10 from below while the inner housing 50 is located inside the cylinder of the fitting portion 12. By engaging a pair of locking pieces (not shown) provided on the inner housing 50 with a pair of locking holes (not shown) provided on the pair of terminals 6, the pair of terminals 6 are fixed to the housing 10 with the upper end portions thereof exposed inside the fitting portion 12.

Next, details of the cover 60, the packing 70, and a pressing plate 80, which are attached to the body portion 11 of the housing 10 from below, will be described in order.

First, the cover 60 will be described. The cover 60 functions to close the opening **10*b* (see FIG. 2) of the body portion 11 of the housing 10. The cover 60 is a resin molded product and has a substantially rectangular outer shape corresponding to the shape of the opening 10*b* (see FIG. 2**).

Next, the packing 70 will be described. The packing 70 is a seal member made of rubber, and functions to seal a gap between an outer peripheral surface of the cover 60 and an inner wall surface of the opening **10*b* of the body portion 11 of the housing 10. The packing 70 has a substantially rectangular annular shape corresponding to the outer shape of the cover 60**.

The packing 70 is attached to the cover 60 so as to be in close contact with the outer peripheral surface of the cover 60. The cover 60 attached with the packing 70 is attached to the opening **10*b* of the body portion 11 of the housing 10. When the cover 60 is attached to the opening 10*b*, the packing 70 is positioned between the outer peripheral surface of the cover 60 and the inner wall surface of the opening 10*b* to seal the gap therebetween. The cover 60 is held by the housing 10 by engaging the locking frame portions 63 of the cover 60 with the locking projections 16 of the housing 10 (see FIG. 1**).

Next, the pressing plate 80 will be described. The pressing plate 80 has a function of preventing the cover 60 attached with the packing 70 from coming off (that is, coming off downward) from the housing 10 and a function of fixing the connector 1 to the mating part. The pressing plate 80 is formed by subjecting a single metal plate to predetermined press process, bending process, and the like.

The pressing plate 80 has a flat plate-like shape capable of covering an entire circumference of an outer peripheral edge of the cover 60 attached to the housing 10. The pressing plate 80 is provided with flange portions 81 at a plurality of locations (two locations in this example) that extend so as to protrude from the housing 10 when the pressing plate 80 is attached to the housing 10 (also see FIG. 1). A bolt insertion hole 82 is formed through each flange portion 81 in the up-down direction.

The pressing plate 80 is attached to the housing 10 from below so as to cover the cover 60 from below, so that the pressing plate 80 is fixed to the housing 10 by being fastened together with the cover 60 by screwing a screw (not shown) into a corresponding female screw portion **10*a* (see FIG. 2) provided on the housing 10. By fixing the pressing plate 80 to the housing 10, the cover 60 to which the packing 70 is attached is prevented from coming off from the housing 10** (that is, coming off downward).

As described above, mounting of the connector 1 is completed, and the connector 1 shown in FIG. 1 is obtained. The mounted connector 1 is mounted to a metal housing of the mating part 90 shown in FIGS. 3 and 4. The fitted portion 91, which is a fitting hole into which the fitting portion 12 is fitted, is formed corresponding to the fitting portion 12 of the housing 10 of the connector 1 at a mounting location of the connector 1 in the housing of the mating part 90. Further, a concave portion 92 having a recessed shape in which the convex portion 13 can be fitted is formed corresponding to the convex portion 13 of the housing 10 of the connector 1.

As shown in FIGS. 3 and 4, the connector 1 is mounted to the mounting location of the mating part 90 so that the fitting portion 12 is fitted into the fitted portion 91 and the convex portion 13 is fitted into the concave portion 92. As a result, as shown in FIG. 4, a semi-cylindrical outer peripheral surface of the convex portion 13 is disposed close to an inner peripheral surface of the concave portion 92.

Next, the connector 1 is fastened and fixed to the housing of the mating part 90 using bolts (not shown) inserted through bolt insertion holes 82 of the flange portions 81 of the pressing plate 80. The mating connector of the mating part 90 is inserted into the fitting portion 12 of the connector 1 fixed to the mating part 90. As a result, mating terminals (female terminals) accommodated in the mating connector are electrically connected to the pair of terminals 6 located within the fitting portion 12.

In this way, when the connector 1 with the built-in fuse 20 is energized under a state in which the connector 1 is mounted to the mating part 90, a temperature of a conductive path (particularly, the body portion 21 with the fused portion of the fuse 20 built therein) in the connector 1 increases due to Joule heat generated by the energization. Here, since the body portion 21 of the fuse 20 is accommodated inside the housing 10, there is concern that heat generated by the fuse 20 may have a thermal effect on the housing 10 and built-in components around the fuse 20.

In this regard, as shown in FIG. 4, when the connector 1 is mounted to the mating part 90, the entire area of the semi-cylindrical outer peripheral surface of the upper approximately half of the body portion 21 of the fuse 20 is disposed close to the semi-cylindrical inner peripheral surface of the convex portion 13, and the semi-cylindrical outer peripheral surface of the convex portion 13 is disposed close to the inner peripheral surface of the concave portion 92. Due to such a positional correlation among the fuse 20, the convex portion 13 and the concave portion 92, the heat generated in the body portion 21 of the fuse 20 is dissipated from the convex portion 13 to the surroundings as shown in FIG. 5, and is absorbed by the concave portion 92 of the mating part 90. Therefore, the heat generated by the fuse 20 can be efficiently dissipated through the convex portion 13 toward the concave portion 92.

Functions and Effects

As described above, according to the connector 1 according to the present embodiment, the body portion 21 that incorporates the fused portion of the fuse 20 that is built in the connector 1 is accommodated in the hollow portion 13*a* of the hollow convex portion 13, which is formed by the part of the body portion 11 of the housing 10 protruding outward. Specifically, a part of the upper wall 14 (outer wall portion) of the body portion 11 of the housing 10 is curved so as to protrude upward, thereby defining the hollow portion 13*a* of the convex portion 13. Similar to the fitting portion 12 of the housing 10, the convex portion 13 of the housing 10 protrudes in the fitting direction with the mating part 90. Due to such disposition and shape of the convex portion 13, when the connector 1 is mounted to the mating part 90, the convex portion 13 accommodating the body portion 21 of the fuse 20 is disposed near the mating part 90. With this disposition, the heat generated by the body portion 21 of the fuse 20 is dissipated from the convex portion 13 of the housing 10 to the surroundings, and is absorbed by the mating part 90. Therefore, the heat generated by the fuse 20 can be dissipated more efficiently than in a case where there is no mating part 90 in the vicinity of the convex portion 13. Therefore, the connector 1 according to the present embodiment is excellent in a heat dissipation property of the heat generated by the fuse 20 when energized (that is, when the connector 1 is mounted to the mating part 90).

Furthermore, the pair of electric wire insertion holes 15 (see FIG. 2) for inserting the pair of electric wires 2 inside and outside the housing 10 are arranged so that the fitting portion 12 is sandwiched between the electric wire insertion holes 15 and the convex portion 13. As a result, a shape of a routing path in the connector 1 can be simplified, and workability of the work of attaching the terminals 6 and the fuse 20 to the housing 10 can be improved.

Furthermore, according to the mounting structure of the connector 1 and the mating part 90 according to the present embodiment, the body portion 21 of the fuse 20 that is built in the connector 1 is accommodated in the hollow portion 13*a* of the hollow convex portion 13, which is formed by the part of the body portion 11 of the housing 10 protruding outward. Similar to the fitting portion 12 of the housing 10, the convex portion 13 of the housing 10 protrudes in the fitting direction with the mating part 90. Furthermore, the mating part 90 includes the fitted portion 91 into which the fitting portion 12 of the connector 1 is fitted, and the concave portion 92 recessed to be fitted with the convex portion 13 of the connector 1. When the connector 1 is mounted to the mating part 90, the convex portion 13 accommodating the body portion 21 of the fuse 20 is fitted to the concave portion 92 of the mating part 90. With such fitting of the convex portion 13 and the concave portion 92, the heat generated by the body portion 21 of the fuse 20 is dissipated from the convex portion 13 of the housing 10 to the surroundings, and is absorbed by the concave portion 92 of the mating part 90. Therefore, the heat generated by the fuse 20 can be efficiently dissipated through the convex portion 13 toward the concave portion 92. Therefore, the mounting structure according to the present embodiment is excellent in the heat dissipation property of the heat generated by the fuse 20 when the connector 1 is energized (that is, when the connector 1 is mounted to the mating part 90).

Other Embodiments

The present disclosure is not limited to the above embodiment, and various modifications can be adopted within the scope of the present disclosure. For example, the present disclosure is not limited to the above-described embodiment, and may be appropriately modified, improved or the like. In addition, materials, shapes, dimensions, numbers, arrangement positions, and the like of each constituent element in the embodiments described above are optional and not limited as long as the object of the present disclosure can be achieved.

In the above embodiment, the pair of electric wire insertion holes 15 (see FIG. 2) for inserting the pair of electric wires 2 inside and outside the housing 10 are arranged so that the fitting portion 12 is sandwiched between the electric wire insertion holes 15 and the convex portion 13. However, the pair of electric wire insertion holes 15 (see FIG. 2) for inserting the pair of electric wires 2 inside and outside the housing 10 may not be arranged so that the fitting portion 12 is sandwiched between the electric wire insertion holes 15 and the convex portion 13.

Furthermore, in the above embodiment, an outer surface of the convex portion 13 of the housing 10 has a curved shape. However, the outer surface of the convex portion 13 may be provided with one or a plurality of protrusions or ribs (so-called heat dissipation fins) protruding outward. These protrusions or ribs enable more efficient heat dissipation through the convex portion 13.

Here, features of the embodiment of the connector 1 and the mounting structure of the connector 1 and the mating part 90 according to the present disclosure described above will be briefly summarized and listed in the following first to fourth aspects.

According to a first illustrative aspect of the present disclosure, a connector (1) includes: a terminal fitting (6); an electric wire (2, 3) connected to the terminal fitting (6); a housing (10) that includes a fitting portion (12) having a shape protruding in a fitting direction with a mating part (90) and accommodating the terminal fitting (6), an outer wall portion (11) defining an internal space (11*a*) in which the electric wire (2, 3) is routed, and a hollow convex portion (13) formed by a part of the outer wall portion (11) protruding outward to have a convex shape in the fitting direction; and a fuse (20) that includes a fused portion (21) accommodated in a hollow portion (13*a*) of the convex portion (13) and is connected to the electric wire (2, 3).

According to the connector having the configuration in the above first aspect, the fused portion of the fuse built in the connector is accommodated in the hollow portion of the hollow convex portion, which is formed by the part of the outer wall portion of the housing protruding outward. Similar to the fitting portion of the housing, the convex portion of the housing protrudes in the fitting direction with the mating part. Due to such disposition and shape of the convex portion, when the connector is mounted to the mating part, the convex portion accommodating the fused portion of the fuse is disposed near the mating part. With this disposition, the heat generated by the fused portion of the fuse is dissipated from the convex portion of the housing to the surroundings, and is absorbed by the mating part. Therefore, the 5 heat generated by the fuse can be dissipated more efficiently than in a case where there is no mating part in the vicinity of the convex portion. Therefore, the connector having this configuration is excellent in a heat dissipation property of the heat generated by the fuse when energized (that is, when the connector is mounted to the mating part).

According to a second illustrative aspect of the present disclosure, the housing (10) includes an insertion portion (15) through which the electric wire (2) is inserted inside and outside the housing (10), at a position where the fitting portion (12) is sandwiched between the convex portion (13) and the insertion portion (15).

According to the connector having the configuration in the above second aspect, the insertion portion through which the electric wire is inserted inside and outside the housing is disposed so that the fitting portion is sandwiched between the insertion portion and the convex portion. As a result, a shape of the electric wire in the connector can be simplified, and the workability of the work of attaching the terminals and the fuse to the housing can be improved.

According to a third illustrative aspect of the present disclosure, the hollow portion (13*a*) of the convex portion (13) is defined by the part of the outer wall portion (11) curving to protrude outward.

According to the connector in the above third aspect, it is possible to easily provide the hollow portion accommodating the fused portion of the fuse in the convex portion of the housing.

According to a fourth illustrative aspect of the present disclosure, a mounting structure includes: the connector (1) according to any one of first to third aspects; and the mating part (90) to which the connector (1) is mounted. The mating part (90) includes a fitted portion (91) into which the fitting portion (12) of the connector (1) is fitted, and a concave portion (92) recessed in a direction away from the connector (1) such that the convex portion (13) of the connector (1) is fitted into the concave portion (92). The connector (1) is mounted to the mating part (90) in a state where the fitting portion (12) is fitted with the fitted portion (91) and the convex portion (13) is fitted in the concave portion (92).

According to the mounting structure having the configuration in the above fourth aspect, the fused portion of the fuse built in the connector is accommodated in the hollow portion of the hollow convex portion, which is formed by the part of the outer wall portion of the housing protruding outward. Similar to the fitting portion of the housing, the convex portion of the housing protrudes in the fitting direction with the mating part. Furthermore, the mating part includes the fitted portion into which the fitting portion of the connector is fitted, and the concave portion recessed to be fitted with the convex portion of the connector. When the connector is mounted to the mating part, the convex portion accommodating the fused portion of the fuse is fitted to the concave portion of the mating part. With such fitting of the convex portion and the concave portion, the heat generated by the fused portion of the fuse is dissipated from the convex portion of the housing to the surroundings, and is absorbed by the concave portion of the mating part. Therefore, the heat generated by the fuse can be efficiently dissipated through the convex portion toward the concave portion. Therefore, the mounting structure having this configuration is excellent in the heat dissipation property of the heat generated by the fuse when the connector is energized (that is, when the connector is mounted to the mating part).

According to the connector and the mounting structure of the connector and the mating part of the present disclosure, the fused portion of the fuse built in the connector is accommodated in the hollow portion of the hollow convex portion, which is formed by the part of the outer wall portion of the housing protruding outward. Similar to the fitting portion of the housing, the convex portion of the housing protrudes in the fitting direction with the mating part. Due to such disposition and shape of the convex portion, when the connector is mounted to the mating part, the convex portion accommodating the fused portion of the fuse is disposed near the mating part (particularly, the concave portion of the mating part). With this disposition, the heat generated by the fused portion of the fuse is dissipated to outside from the convex portion of the housing, and the heat dissipated to the outside is efficiently absorbed by the mating part. Therefore, the heat generated by the fused portion of the fuse can be dissipated more efficiently than in a case where there is no mating part in the vicinity of the convex portion. Therefore, the connector having this configuration and the mounting structure of the connector and the mating part are excellent in a heat dissipation property of the heat generated by the fuse when energized (that is, when the connector is mounted to the mating part).

What is claimed is:

1. A connector, comprising:

a terminal fitting;

an electric wire connected to the terminal fitting;

a housing that includes a fitting portion having a shape protruding in a fitting direction with a mating part and accommodating the terminal fitting, an outer wall portion defining an internal space in which the electric wire is routed, and a convex portion formed by a part of the outer wall portion protruding outward to have a convex shape in the fitting direction; and a fuse that includes a fused portion accommodated in a hollow portion of the convex portion and is connected to the electric wire, wherein the housing includes an insertion portion through which the electric wire is inserted inside and outside the housing, at a position where the fitting portion is sandwiched between the convex portion and the insertion portion.

2. The connector according to claim 1, wherein the hollow portion of the convex portion is defined by the part of the outer wall portion curving to protrude outward.

3. A mounting structure, comprising:

a connector, and a mating part to which the connector is mounted, the connector comprising:

a terminal fitting;

an electric wire connected to the terminal fitting;

a housing that includes a fitting portion having a shape protruding in a fitting direction with the mating part and accommodating the terminal fitting, an outer wall portion defining an internal space in which the electric wire is routed, and a convex portion formed by a part of the outer wall portion protruding outward to have a convex shape in the fitting direction; and a fuse that includes a fused portion accommodated in a hollow portion of the convex portion and is connected to the electric wire, wherein the mating part includes a fitted portion into which the fitting portion of the connector is fitted, and a concave portion recessed in a direction away from the connector such that the convex portion of the connector is fitted into the concave portion, and the connector is mounted to the mating part in a state where the fitting portion is fitted with the fitted portion and the convex portion is fitted in the concave portion.

* * * * *